July 23, 1968  G. A. KENDALL ET AL  3,393,917

FLUID SEAL

Filed Oct. 23, 1965

INVENTOR
GILES A. KENDALL
BY ALBERT Y. ODA

R. E. Geangue

ATTORNEY

United States Patent Office 3,393,917
Patented July 23, 1968

3,393,917
FLUID SEAL
Giles A. Kendall, Tarzana, and Albert Y. Oda, San Fernando, Calif., assignors to Menasco Manufacturing Company, Burbank, Calif., a corporation of California
Filed Oct. 23, 1965, Ser. No. 503,298
3 Claims. (Cl. 277—103)

ABSTRACT OF THE DISCLOSURE

A fluid seal comprising inner and outer rigid metal rings and an intervening resilient seal ring. Fluid pressure urges the inner ring toward the outer ring, axially compressing the resilient seal ring and expanding same radially into fluid sealing relation with the rod and the bore containing the rings. The difference in area of the inner ring and of the seal ring causes the contact pressure of the seal ring to exceed the contained fluid pressure. To prevent extrusion of the seal ring material, a slipper seal provides a low friction interface with the rod and the outer end face of the slipper seal is conically beveled or tapered to define a space for receiving a retainer ring. The retainer ring is preferably constructed of a relatively hard plastic to prevent extrusion of the slipper seal and seal ring.

---

Figure 1:
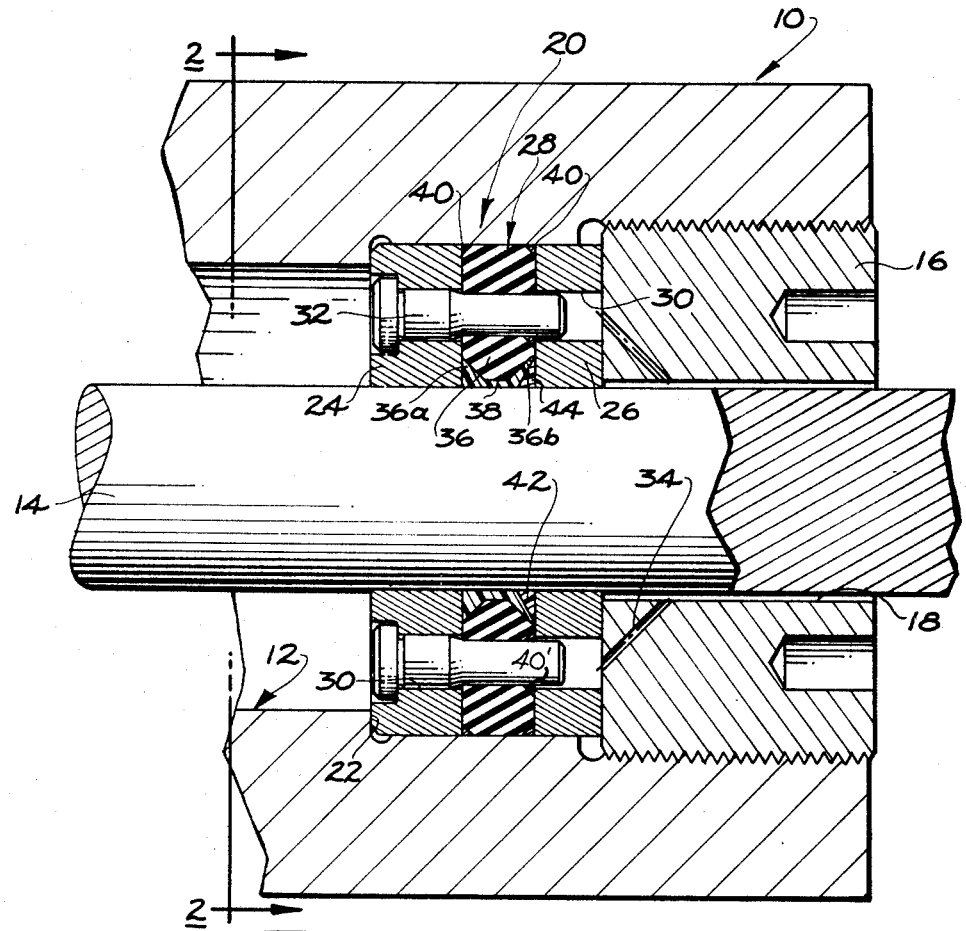

This invention relates generally to fluid seals and has more particular reference to improvements in fluid seals for sealing an axially movable shaft to the wall of a surrounding gland bore.

Many different kinds of fluid pressure devices embody the basic elements of a pressure vessel for containing a fluid under pressure and an axially movable rod which extends to the exterior of the vessel through an opening, or gland bore, in the wall of the vessel. One such device, for example, is a cylinder containing a piston having a rod extending through a gland bore in one end wall of the cylinder. In fluid pressure devices of this type, it is necessary to seal the rod to the wall of the gland bore without creating any excessive frictional drag on the rod.

One of the more efficient fluid seals, or seal assemblies, for this purpose comprises a pair of inner and outer rigid metal rings and an intervening resilient seal ring. These rings surround the rod within the gland bore. The rigid rings are internally dimensioned to slidably receive the rod and are externally dimensioned to fit closely in the bore. The outer rigid ring is fixed to the wall of the gland bore so as to form a fixed annular pressure wall about the rod. The inner rigid ring slides in the gland bore and forms an axially movable annular pressure wall about the rod which is exposed to fluid pressure in the pressure vessel. This fluid pressure urges the movable wall toward the fixed wall, thereby axially compressing the intervening resilient seal ring axially and expanding the seal ring radially into fluid sealing relation with the rod and the wall of the gland bore. The effective area of contact of the seal ring with the movable pressure wall is less than the effective area of the movable pressure wall on which the contained fluid pressure acts. This results in a unit contact pressure between the seal ring and the movable pressure wall, and hence a unit contact pressure between the mating sealing surfaces on the seal assembly and the pressure fluid device, which exceed the contained fluid pressure, as is necessary for an optimum fluid sealing action.

One of the inherent deficiencies of fluid seals of this kind resides in the fact that the resilient material of the seal ring tends to extrude into the annular spaces between the outer edges of the rigid pressure walls and the wall of the bore and the annular clearance spaces between the inner edges of the pressure walls and the rod. This results in a loss of the resilient seal material and, as a consequence, in eventual destruction of the fluid-tight integrity of the seal. The most serious extrusion of the seal ring material tends to occur between the rod and the inner edge of the fixed pressure wall.

It is a general object of this invention to provide an improved fluid seal of the character described which is uniquely constructed to prevent extrusion of the resilient seal ring into the annular space between the inner edge of the fixed pressure wall and the axially movable rod without appreciably increasing the frictional drag imposed by the seal on the rod.

A further object of the invention is to provide an improved fluid seal of the character described whose complexity and cost of manufacture are increased only slightly as compared to a conventional fluid seal of this kind.

Other objects, advantages, and features of the invention will become readily evident as the description proceeds.

With these and such other objects in view, the invention consists in the construction, arrangement, and combinations of the parts of the seal, whereby the objects contemplated are attained, as hereinafter set forth, pointed out in the appended claims, and illustrated in the accompanying drawings.

Figure 2:
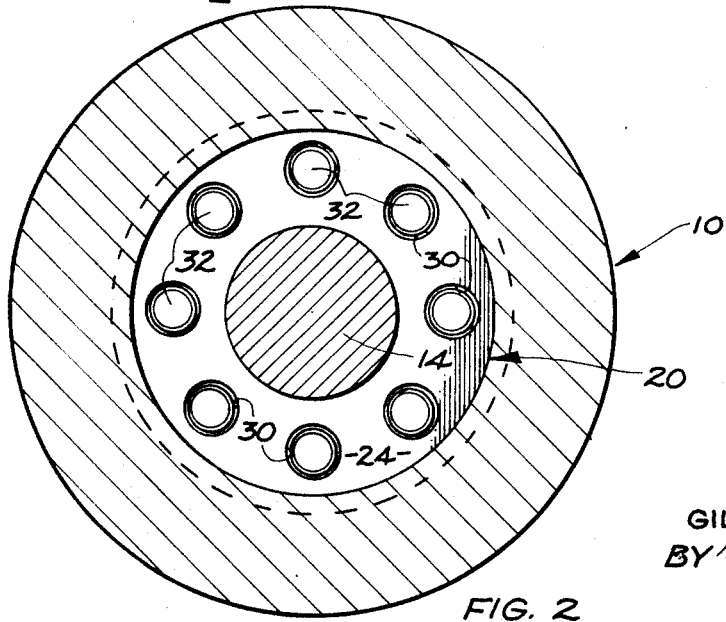

In these drawings:

FIGURE 1 is a longitudinal section through an improved fluid seal according to the invention; and FIGURE 2 is a section taken on line 2—2 in FIGURE 1.

In these drawings, reference numeral 10 designates a pressure vessel having a bore 12 through which extends an axially movable shaft or rod 14. Threaded in the outer end of the bore 12 is a gland nut 16 having a central bore 18 to loosely receive the rod. The illustrated structure may be embodied in various types of fluid pressure devices. For example, the pressure vessel 10 may comprise a hydraulic cylinder and the rod 14 may comprise the rod of a piston movable in the cylinder.

Rod 14 is sealed to the wall of the bore 12 by an improved fluid seal 20 according to the invention. This fluid seal is positioned between the gland nut 16 and an internal annular shoulder 22 in the gland bore. Seal assembly 20 comprises relatively rigid inner and outer rings 24 and 26, respectively, and an intervening resilient seal ring 28. Press fitted in the inner rigid ring 24, and extending axially through the seal ring 28 into aligned bores 30 in the outer ring 26, are pins 32 whose function will be described presently. Bleed passages 34 communicate the outer ends of the ring bores 30 to the central bore 18 through the gland nut 16. As will appear presently, the rigid rings 24 and 26 function as movable and fixed annular pressure walls, respectively. Accordingly, these rings are hereinafter referred to as movable and fixed pressure walls, respectively. Pressure walls 24 and 26 are externally dimensioned to fit slidably in the gland bore 12 and are internally dimensioned to slidably receive the rod 14. The outer pressure wall 26 seats against the inner face of and is restrained against outward movement in the gland bore by the gland nut 16.

The seal ring 28 comprises an annular gasket 36 composed of rubber or other suitable resilient material. This gasket has generally planar side faces which seat against the pressure walls 24 and 26, respectively. The inner circumference of the gasket 36 is of generally convex configuration in radial cross section, as shown. Extending about the inner circumference of the gasket is slipper seal 38 constructed of Teflon or other suitable low friction material. This slipper seal has an external concave configuration in radial cross section which receives and generally complements the inner circumference of the gasket 36. Slipper seal 38 is internally dimensioned to slidably receive the rod 14.

The movable pressure wall pins 32 extend through aligned bores in the gasket 36, as shown. Encircling the outer edges of the gasket are outer retainer rings 40 constructed of aluminum bronze, or other suitable material, for preventing extrusion of the gasket material under the annular spaces between the pressure walls 24, 26 and the wall of the bore 12. Also, a retainer ring 40' of similar material surrounds each pin 32 to prevent extrusion of the gasket material around the pins.

The fluid seal, or seal assembly, 20, as it is thus far described, is conventional. During operation of the illustrated fluid pressure device, the inner movable pressure wall 24 is exposed to the contained fluid pressure in the pressure vessel or cylinder 10. This fluid pressure acts on the effective cross-sectional area of the movable wall and urges the latter axially toward the fixed pressure wall 26. The resilient seal ring 28 is thereby axially compressed between the walls and, as a consequence, is radially expanded into sealing relation or engagement with the wall of the bore 12 and the outer surface of the rod 14. During relative movement of the pressure walls, in response to pressure changes, for example, the movable pressure wall pins 32 move axially through their respective bores in the gasket 36. These pins reduce the effective area of contact of the seal ring with the movable pressure wall 24. The effective contact area between the seal ring and the movable pressure wall is less than the effective area of the movable pressure wall on which the contained fluid pressure acts by an amount equal to the combined cross-sectional areas of the forward ends of the pins 32 which extend through the gasket 36. Accordingly, the unit contact pressure between the seal ring 28 and the movable pressure wall 24 exceeds the contained fluid pressure active on the latter wall. This increased contact pressure is transmitted generally uniformly throughout the resilient body of the gasket 36 and creates an internal stress or pressure within the gasket. The axial component of the internal gasket pressure opposes outward movement of the pressure wall 24 under the action of the contained fluid pressure. The radial component of the internal gasket pressure urges the inner and outer sealing surfaces on the seal ring 28 into sealing relation with the rod 14 and the wall of the bore 12, respectively, and creates a contact pressure between the mating sealing surfaces which exceed the contained fluid pressure, as required for an optimum sealing action.

One of the inherent deficiencies in a fluid seal of this type resides in the fact that the resilient material of gasket 36 tends to extrude between the outer edges of the pressure walls 24, 26 and the wall of the bore 12. Also, the slipper seal 38 tends to extrude between the inner edges of the pressure walls and the rod 14. Extrusion of the gasket material between the outer edges of the pressure walls and the wall of the bore is prevented by the retainer rings 40, as noted earlier. However, the most serious extrusion tends to occur between the inner edge of the fixed pressure wall 26 and the rod 14. It is this latter extrusion with which the present invention is primarily concerned and which the invention seeks to prevent.

According to the present invention, the axially outer face of the resilient seal ring 28 is axially recessed about the central, rod-receiving opening through the ring in such a way that the seal ring and the fixed pressure wall 26 define therebetween a generally V-shaped space or groove 42 which surrounds and opens radially toward the rod 14. In the illustrative embodiment of the invention, the outer end face of the slipper seal 38 is conically beveled or tapered, as shown, to define the space or groove 42.

Disposed within the groove 42 is a complementary shaped retainer ring 44 which is internally dimensioned to slidably receive the rod 14. The primary function of retainer ring 44 is to prevent extrusion of slipper seal 38. The function of slipper seal 38 is to provide a low friction interface with rod 14 and is generally made from a soft low friction plastic material such as Teflon. While this material yields a minimum friction seal, its low strength results in premature failure due to extrusion. The two delta-shaped portions of the slipper seal 38 are to prevent the material of gasket 36 from extruding down the faces of pressure walls 24 and 26 into contact with rod 14. In order to minimize the frictional drag imposed on the rod 14, it must be constructed of a material which has a relatively low coefficient of friction against the surface of the rod while still having relatively high strength. In this case, the retainer ring is preferably constructed of a relatively hard plastic, such as nylon or nylon loaded with a lubricant such as molybdenum disulfide having a suitable low coefficient of friction.

It is significant to note here that the outward axial force of the slipper seal 38 against the inner conically tapered face of the retainer ring 44 produces a radial compression force on the retainer ring which tends to contract the ring about the rod 14. Accordingly, the retainer ring is urged both axially against the fixed pressure wall 26 and radially against the rod 14. This aids in preventing extrusion of the materials of the gasket 36 and the slipper seal 38 into the annular clearance space between the fixed pressure wall 26 and the rod 14. As a consequence, the present retainer ring 44 has been found to be highly effective in preventing such extrusion. However, radial contraction of the retainer ring about the rod 14 also tends to increase the friction between the rod and ring. This friction is controlled or minimized by making the cone angle of the abutting conical faces on the slipper seal 38 and the retainer ring 44 relatively large. In this regard, it is significant to note that in the illustrated embodiment of the invention, this cone angle is substantially larger than 45°. Accordingly, the radial compressive force produced on the retainer ring by the axial thrust thereagainst of the slipper seal 38 is controlled or minimized.

It is now evident, therefore, that the invention herein described and illustrated is fully capable of attaining the several objects and advantages preliminarily set forth.

While a presently preferred embodiment of the invention has been disclosed for illustrative purposes, it is to be understood that the invention is not limited to this disclosure and that various modifications in the design, arrangement of parts, and instrumentalities of the invention are possible within the spirit and scope of the following claims.

What is claimed as new in support of Letters Patent is:
1. In a fluid pressure device including a pressure vessel having a gland bore opening through the wall of said vessel and an axially movable rod extending through said bore, a fluid seal for sealing said rod to the wall of said bore comprising:
  relatively rigid annular pressure walls surrounding said rod within said bore;
  the outer pressure wall being a fixed pressure wall and the inner pressure wall being a movable pressure wall which is exposed to the fluid pressure in said vessel;
  said pressure walls being internally dimensioned to slidably receive said rod and said movable pressure wall being externally dimensioned to slide in said bore;
  means restraining said fixed pressure wall against outward axial movement in said bore;
  a resilient seal ring disposed between and in contact with said pressure walls and having inner and outer sealing surfaces confronting said rod and the wall of said gland bore, respectively, whereby the contained fluid pressure in said vessel urges said movable pressure wall outwardly toward said fixed pressure wall to axially compress said seal ring and thereby radially expand said seal ring into sealing engagement with said rod and the wall of said gland bore;

the axially outer face of said seal ring being conically recessed about the central opening through said ring, thereby to define between said seal ring and said fixed pressure wall a groove which extends circumferentially about and opens radially inward toward said rod;

a complementary shaped retainer ring of relatively hard low friction material disposed within said groove and having a central opening slidably receiving said rod;

said seal ring comprising a radially outer annular resilient gasket and a radially inner low friction slipper seal extending about the inner circumference of said gasket and having a central opening therethrough slidably receiving said rod;

pins rigidly fixed to said movable pressure wall and extending axially through said gasket into aligned bores in said fixed pressure wall for reducing the effective contact area of said seal ring with said movable pressure wall relative to the effective area of said movable pressure wall on which the contained fluid pressure acts, whereby the contact pressure between the mating sealing surfaces on said seal ring and said rod and the wall of said gland bore exceeds said contained fluid pressure; and the axially outer end face of said slipper seal being conically tapered to define said groove with said fixed pressure wall.

2. A fluid seal comprising:

a pair of relatively rigid annular pressure walls;

one of said walls being a relatively fixed pressure wall and the other pressure wall being a relatively movable pressure wall;

a resilient seal ring disposed between and in contact with said pressure walls;

the face of said seal ring confronting said fixed pressure wall being conically recessed about the central opening through said ring to define with said fixed pressure wall a groove which extends circumferentially about and opens radially to said opening;

a relatively hard low friction retainer ring disposed within and complementing said groove;

said seal ring comprising a radially outer resilient annular gasket and a radially inner low friction slipper seal extending about the inner circumference of said gasket;

the end face of said slipper seal adjacent the fixed pressure wall being conically tapered to define said groove with said fixed pressure wall; and pins rigidly fixed to said movable pressure wall and extending axially through said gasket into aligned bores in said fixed pressure wall for reducing the effective area of contact of said resilient seal ring with said movable pressure wall relative to the effective cross-sectional area of said movable pressure wall.

3. A fluid seal according to claim 2 wherein:

said slipper seal is constructed of Teflon (polytetrafluorethylene) and has two delta-shaped portions, one adjacent said relatively movable wall and the other adjacent said retainer ring.

References Cited

UNITED STATES PATENTS

| 2,308,149 | 1/1943 | Bingham | 277—188 X |
| 2,644,804 | 7/1953 | Rubin | 277—237 X |
| 3,149,848 | 9/1964 | Galloway | 277—165 |

FOREIGN PATENTS

| 895,032 | 4/1962 | Great Britain. |
| 929,528 | 6/1963 | Great Britain. |

SAMUEL ROTHBERG, *Primary Examiner.*